US006469860B1

United States Patent
Hedding et al.

(10) Patent No.: US 6,469,860 B1
(45) Date of Patent: Oct. 22, 2002

(54) DAMPED TAPE HEAD

(75) Inventors: Larry R. Hedding, Boulder, CO (US); Donald W. Selg, Westminster, CO (US); Jeffrey M. Waynik, Nederland, CO (US); Joseph P. Falace, Louisville, CO (US); John S. Todor, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/543,834

(22) Filed: Apr. 5, 2000

(51) Int. Cl.[7] .............................................. G11B 21/02
(52) U.S. Cl. ...................... 360/75; 360/78.02; 360/291
(58) Field of Search ........................... 360/78.02, 261.1, 360/75, 77.01, 77.12, 77.13, 84, 77.08, 70, 291, 251.1, 270; 352/31

(56) References Cited

U.S. PATENT DOCUMENTS

| 3,732,546 | A | * | 5/1973  | Ronkin et al. ................ 360/70    |
| 3,812,533 | A | * | 5/1974  | Kimura et al. ............ 360/77.08     |
| 4,226,510 | A | * | 10/1980 | Svatek ......................... 352/31  |
| 5,448,430 | A | * | 9/1995  | Bailey et al. ............. 360/77.12    |
| 5,602,694 | A | * | 2/1997  | Miles et al. .................... 360/84 |
| 5,675,448 | A | * | 10/1997 | Molstad et al. ........... 360/77.12     |
| 5,739,984 | A | * | 4/1998  | Eckberg .................... 360/261.1   |
| 5,805,372 | A | * | 9/1998  | Hoogendoorn et al. .. 360/77.01          |
| 5,923,494 | A | * | 7/1999  | Arisaka et al. .......... 360/78.02      |
| 6,018,434 | A | * | 1/2000  | Saliba ..................... 360/77.13   |
| 6,075,678 | A | * | 6/2000  | Saliba ........................ 360/291  |

* cited by examiner

Primary Examiner—David Hudspeth
Assistant Examiner—Fred F. Tzeng
(74) Attorney, Agent, or Firm—Brooks & Kushman P.C.

(57) ABSTRACT

The recent trend towards incorporating a higher density of data tracks on magnetic tape has necessitated more accurate mechanisms for positioning tape heads. A system for seeking tracks on a magnetic tape via a fine position adjustment system includes a carriage frame that holds a magnetic tape head. The magnetic tape head reads and writes magnetic tape as the tape passes in close proximity to the tape head. Flexures attach the carriage frame to the tape head permitting movement in a transverse direction normal to the direction of tape travel across the head while restricting movement of the tape head in a direction parallel to tape travel or in a direction normal to the tape surface. A drive mechanism moves the tape head in the transverse direction in response to a control signal. A linear tachometer provides a velocity signal based on the movement of the tape head in the transverse direction. Control logic receives a command to move the tape head in the transverse direction, generates a control signal to change the head position, and modifies the control signal to dampen tape head oscillations relative to the carriage frame based on the velocity signal.

13 Claims, 8 Drawing Sheets

DAMPED TAPE HEAD

TECHNICAL FIELD

The present invention relates to damping the motion used to position a magnetic tape head across the width of a magnetic tape.

BACKGROUND ART

Magnetic tape is commonly used to store voice and data information due to its reliability, cost efficiency, and ease of use. Magnetic tape may be made more useful and cost effective by increasing the areal density of information stored on the magnetic tape. This has generally been accomplished by including more data tracks on a given width of tape. While allowing more data to be stored, this increase in the number of data tracks requires a narrowing of the width of the data tracks, a narrowing of spacing between the data tracks, or both. As the data tracks are more closely spaced, positioning of the tape with respect to the tape head becomes more critical to reduce the possibility of errors introduced by reading or writing.

A tape head generally includes multiple read elements for simultaneously reading data from multiple data tracks and multiple write elements for simultaneously writing data to multiple data tracks. Typically, the number of data tracks is greater than the number of read or write elements. This requires the tape head to be properly positioned in a transverse direction across the width of the magnetic tape. Further, due to inaccuracies in data recording, tape geometry, and the tape path, the head position relative to the tape must be monitored and, if necessary, the head position modified to keep read and write elements centered over data tracks. To assist in head positioning, the head includes servo read elements that sense servo tracks interspersed with data tracks on the magnetic tape. The servo tracks include patterns that may be used to generate position error signals indicating the relative position of read elements and write elements to a particular set of data tracks. The servo tracks may also include patterns to identify over which set of data tracks read elements and write elements are currently located. The location of head elements over a particular set of data tracks is referred to as coarse positioning or track seeking while maintaining head elements centered over data tracks is referred to as fine positioning or track following.

There are many problems related to head positioning. One problem is the mechanism used to suspend the head. Typically, flexures such as a pair of simple cantilever springs or coil springs are used to suspend the tape head. An actuator, such as a voice coil motor, moves the head in the transverse direction against the opposing force of the flexures. In addition to transverse movement, the design of most flexures permit rotational head motion, translational motion normal to the transverse direction, or both. This results in a less than optimal position for some or all of the tape head elements.

A second problem is head motion damping. The head mass and flexures combine to produce an oscillatory system. When the tape head is moved, it will tend to exhibit decaying oscillation around a final position. In order to decrease head movement response time, damping is added to accelerate the rate of oscillation decay. Typically, purely mechanical damping is used. The damping may be provided by surrounding air, an additional viscous fluid, an elastomeric material connected between the head and the actuator, or the like. It is difficult to tune a purely mechanical system to compensate for mechanical variations in the head system and for changing operating conditions.

A third problem results from cabling used to carry electrical signals to and from the tape head. Typically, one or more cables connect the tape head to electronic cards which process read element signals and generate write element signals. These cables can exert forces on the tape head that impede proper head positioning. Further, electrical signals traveling on the cables can produce electromagnetic interference which may adversely affect signals on adjacent cables.

What is needed is a magnetic tape recording head system with improved positional accuracy and response time. The tape head should be restricted from any motion not in the transverse direction. The tape head should also be subjected to minimal forces from cabling connecting the head to read and write cards. Further, electrical signals traveling along cabling should not produce interference that adversely affects the operation of the tape system.

SUMMARY OF THE INVENTION

It is an object of the present invention to provide a system for accurately positioning a magnetic tape head across data tracks on a magnetic tape.

It is another object of the present invention to provide a system for damping undesirable oscillations that occur as a magnetic tape head is positioned across a magnetic tape.

It is still another object of the present invention to provide a system for accurately positioning a magnetic tape head across a magnetic tape that utilizes flexures restricting motion of the magnetic head in all directions except the transverse direction.

It is yet another object of the present invention to provide a system for accurately positioning a magnetic tape head across a magnetic tape having head interconnection cables that do not interfere with the positioning of the head.

It is a further object of the present invention to provide interconnection cables with minimal electromagnetic interference between cables and between any cable and electrical circuitry.

In carrying out the above objects and other objects and features of the present invention, a system for accessing magnetic tape is provided. The system includes a carriage frame and a magnetic tape head suspended from the carriage frame. A drive mechanism moves the tape head in a transverse direction relative to the carriage frame in response to a control signal. A linear velocity tachometer determines a velocity signal based on head movement in the transverse direction. Control logic receives a command to move the tape head, generates a control signal to change the head position, and modifies the control signal to dampen tape head oscillations relative to the carriage frame based on the velocity signal.

In an embodiment of the present invention, the magnetic tape head is suspended from the carriage frame by two flexures. The flexures permit the tape head to move in the transverse direction with respect to the carriage frame while restricting movement of the tape head in a direction parallel to tape travel and in a direction normal to the tape surface. In a refinement, each flexure includes a first spring member shaped like a rectangular frame, the rectangular frame defining a rectangular opening within the first spring member. A second spring member shaped substantially like a rectangular strip extends from a short side of the rectangular frame into the rectangular opening. The rectangular frame short side opposite the short side from which the second spring member extends is rigidly attached to the carriage frame and the rectangular strip short end opposite the short end extending from the rectangular frame is rigidly attached to the tape head.

In another embodiment of the present invention, the velocity tachometer includes a conductive sensing coil stationary relative to a magnetic field, the velocity signal based on the voltage produced by the sensing coil moving through the magnetic field. In a refinement, the velocity tachometer further includes at least one pair of magnets rigidly attached to the head frame and spaced so as to produce a magnetic field between the magnets in each pair. Each magnetic field has flux lines extending normal to the transverse direction. The conductive sensing coil is rigidly attached to the carriage frame and positioned to move between each of the at least one pair of magnets.

In still another embodiment of the present invention, the drive mechanism is a voice coil motor including a drive magnet rigidly attached to the tape head and a conductive motive coil rigidly attached to the carriage frame, the motive coil forming an opening for admitting the magnet. In a refinement, the voice coil motor further includes a cup having an open end. The cup is positioned around the drive magnet so as to admit the motive coil through the open end. The cup is constructed of a magnetically permeable material to reduce the effect on the tape head of a magnetic field produced by the drive mechanism.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
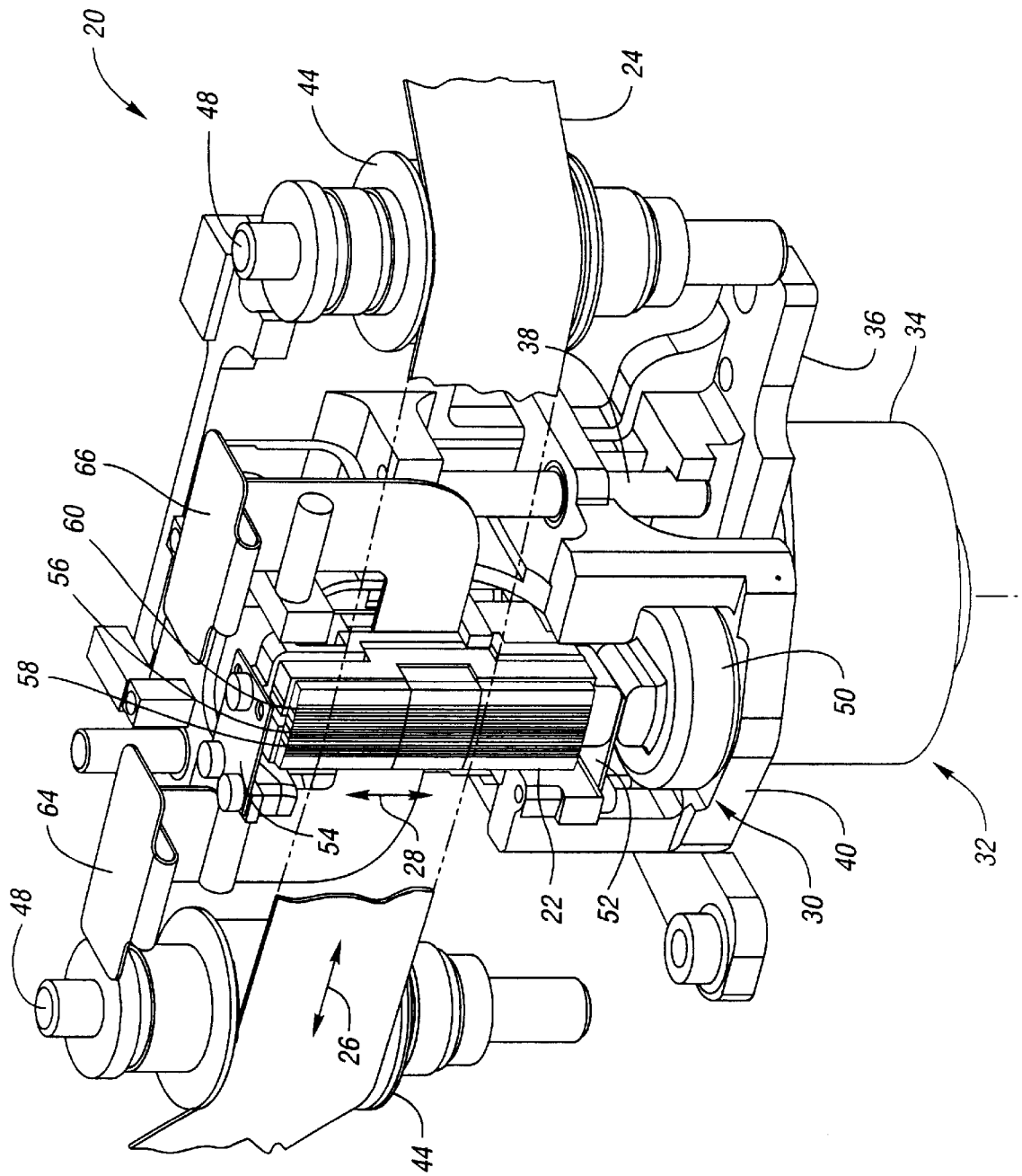
FIG. 1 is a perspective view illustrating a tape system according to an embodiment of the present invention.

Referring to FIG. 1, a drawing illustrating a tape system according to an embodiment of the present invention is shown. A tape system, shown generally by 20, adjusts the position tape head 22 relative to magnetic tape 24 as magnetic tape 24 moves past tape head 22 in tape direction 26. Tape head 22 is moved in transverse direction 28 so as to position tape head 22 across the width of tape 24. Transverse direction 28 may be defined as normal to tape direction 26 and parallel to the surface to tape 24 as tape 24 crosses head 22. Tape head 22 is positioned such that read and write elements within tape head 22 can access particular data tracks on magnetic tape 24 not shown for clarity.

As is known in the art, tape head 22 may include one or more servo read elements for reading servo tracks written onto magnetic tape 24. A first set of servo track patterns may be used to indicate over which set of tracks head elements are located. A second set of servo track patterns may be used to generate an error pattern indicating how far from the center of a servo track the servo read element is located. Servo track patterns are generally repeated in servo frames along the length of magnetic tape 24.

Two types of positioning are required. Coarse positioning or track seeking positions elements in tape head 22 coarsely over a desired set of data tracks. Fine positioning or track following keeps head elements centered over the desired set of data tracks. Coarse positioning requires moving tape head 22 over a relatively greater distance at a slower speed and with less accuracy than fine positioning. Coarse positioning is done relatively infrequently and does not typically occur during data read or write. Fine positioning is done as needed during read and write operations. Hence, greater control is required for fine positioning. To satisfy the differing needs of coarse and fine positioning, two drive mechanisms may be employed. A fine positioning drive mechanism, shown generally by 30, is connected to tape head 22 to provide rapid and precise movement. A coarse positioning drive mechanism, shown generally by 32, moves tape head 22 and fine positioning system 30.

Coarse positioning drive mechanism 32 includes coarse actuator 34 rigidly affixed to motor mount 36. Coarse actuator 34 may be, for example, a stepper motor. Two carriage shafts, one of which is indicated by 38, are attached to motor mount 36. Carriage shafts 38 pass through carriage frame 40 permitting coarse actuator 34 to move fine positioning drive mechanism 30 in transverse direction 28. Coarse actuator 34 drives a lead screw which passes through a lead screw nut, not shown in this view, attached to carriage frame 40. Two tape guides 44 permit tape 24 to travel in tape direction 26 past tape head 22. A bearing support, not shown, rigidly attached to motor mount 36, holds one tape shaft 48 for each tape guide 44 about which tape guide 44 may rotate.

Fine positioning drive mechanism 30 includes voice coil motor 50, a portion of which is rigidly attached to carriage frame 40. A second portion of voice coil motor 50 is connected to the bottom of tape head 22 by bottom flexure 52. Top flexure 54 connects the top of tape head 22 to carriage frame 40. Flexures 52, 54 permit tape head 22 to move in transverse direction 28 with respect to carriage frame 40 while restricting movement of tape head 22 in tape direction 26, in a direction normal to the surface of tape 24, or in a rotational direction such as about an axis normal to the surface of tape 24 or about an axis parallel to transverse direction 28. Fine positioning drive mechanism 30 is more fully described below.

Tape head 22 includes write module 56 between first read module 58 and second read module 60. This arrangement permits read-after-write for either tape direction 26. A write cable, not shown for clarity, connects write elements in write module 56 to drive electronics also not shown for clarity. First read cable 64 and second read cable 66 connect read elements in first read module 58 and second read module 60 respectively to read electronics not shown for clarity. The write cable and read cables 64, 66 are more fully described below.

Figure 2:
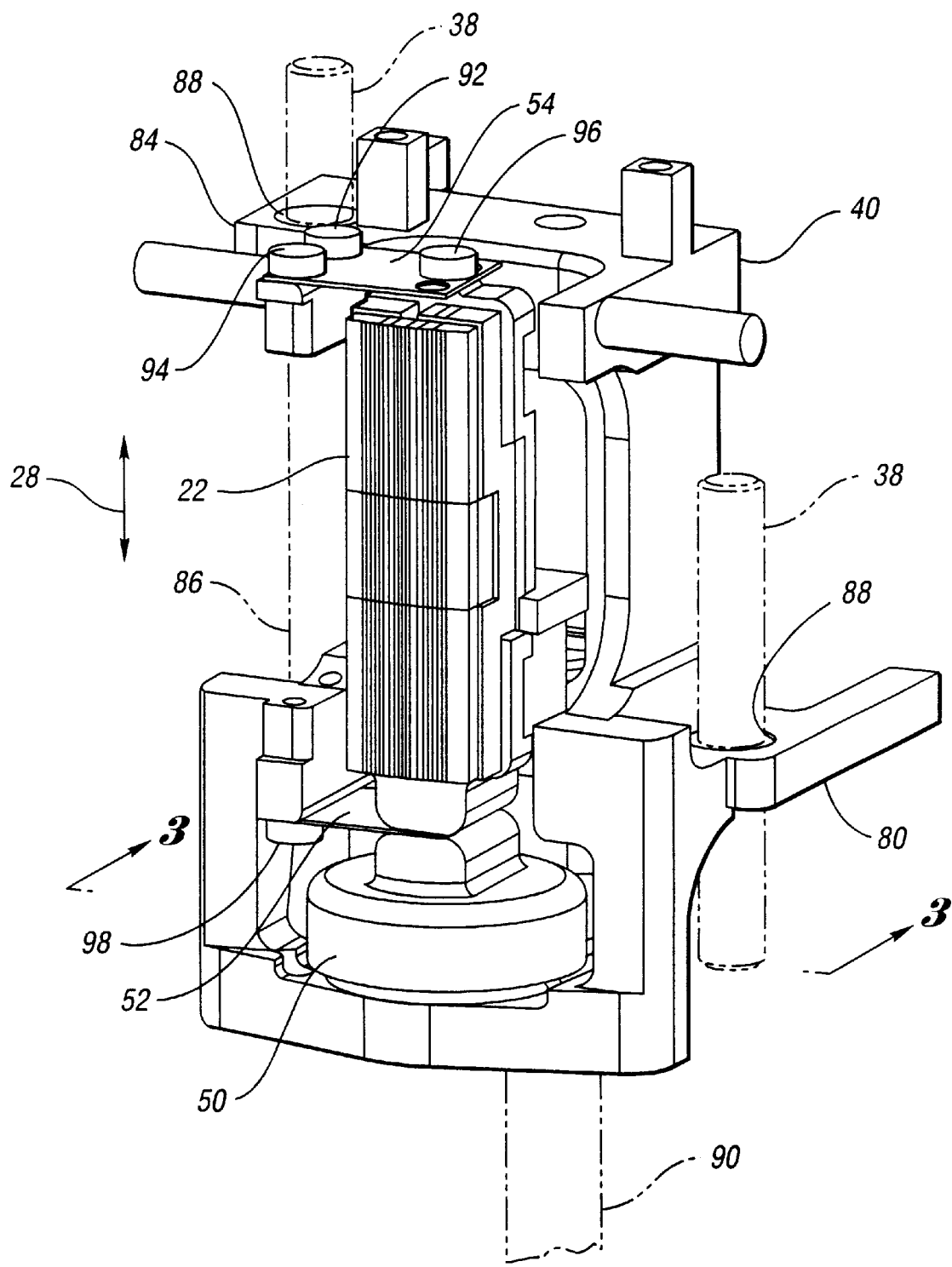
FIG. 2 is a perspective view of the magnetic tape head fine positioning system illustrating the placement of the magnetic head assembly.

Referring now to FIG. 2, a perspective view of an embodiment of the fine positioning system is shown. Carriage frame 40 includes right flange 80 and left flanges 84, 86. Each flange defines a hole accepting one bearing 88. Bearings 88 permit carriage frame 40 to move in transverse direction 28 along carriage shafts 38. Lead screw 90, driven by coarse actuator 34, passes through a lead screw nut attached to carriage frame 40, converting the rotation of lead screw 90 into movement of carriage frame 40 in transverse direction 28.

Flexure screws 92, 94 attach top flexure 54 to carriage frame 40. Flexure screw 96 attaches top flexure 54 to the top of tape head 22. Two flexure screws, one of which is indicated by 98, attach bottom flexure 52 to carriage frame 40. The connection of bottom flexure 52 to a portion of voice coil motor 50 is described with regards to FIG. 3 below.

Figure 3:
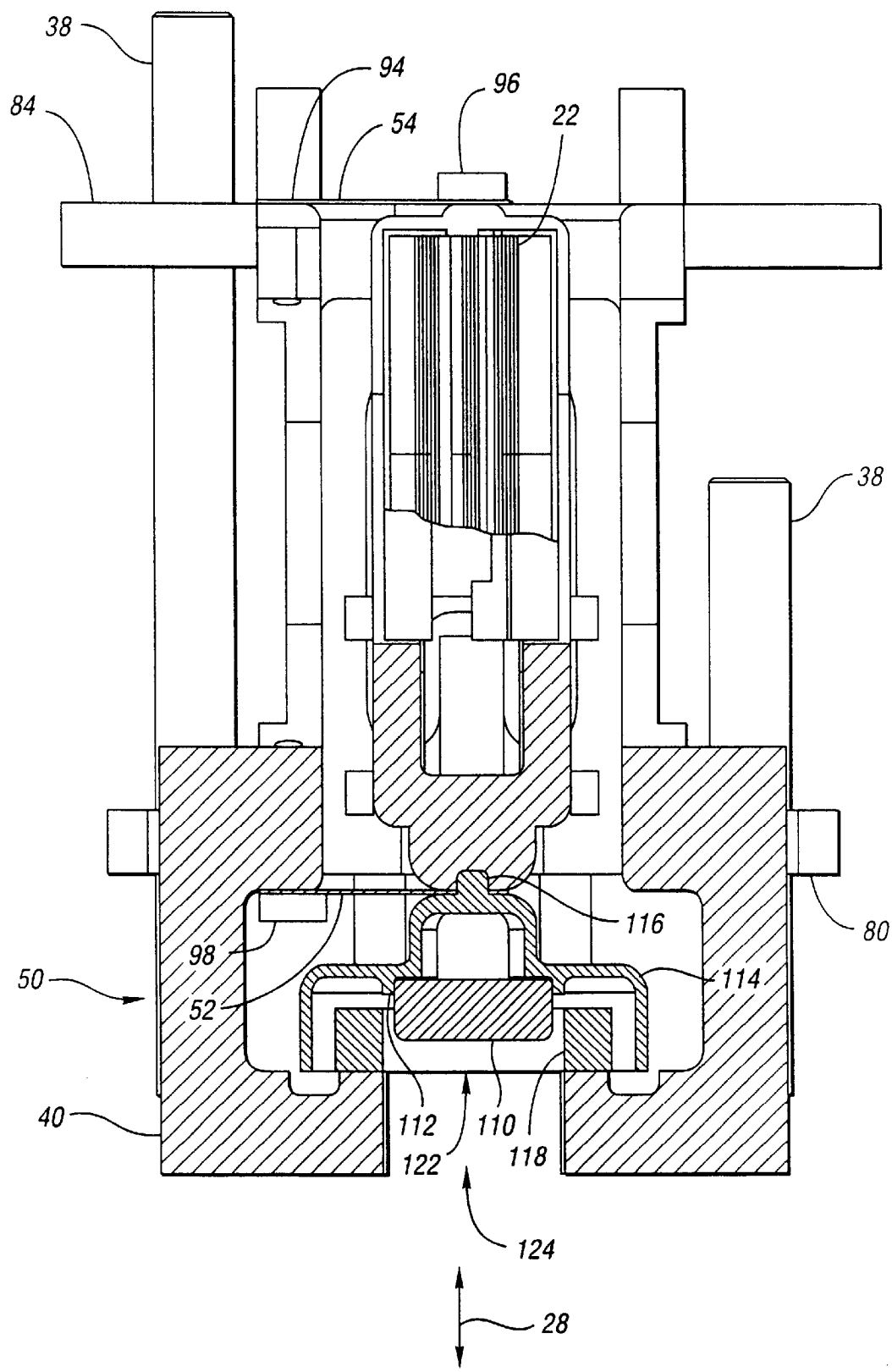
FIG. 3 is a partial cross-sectional view of the voice coil motor.

Referring now to FIG. 3, a partial cross section of the voice coil motor is shown. Voice coil motor 50 includes cylindrical drive magnet 110 press fit into circular flange 112 on cup 114. Cup 114 includes nib 116 which inserts through a hole in bottom flexure 52 and into a mating depression in tape head 22. Two flexure screws on either side of nib 114, not seen in this section, rigidly attach cup 114, bottom flexure 52 and tape head 22. Voice coil motor 50 also includes conductive motive coil 118 encircling drive magnet 110. Motive coil 118 is rigidly attached, such as by glue, to carriage frame 40. During operation, current in motive coil 118 generates a magnetic field which interacts with the magnetic field of drive magnet 110 to move tape head 22 in transverse direction 28 against the restoring force of flexures 52, 54.

Cup 114 is preferably made of a magnetically permeable material such as ASTM A924 galvannealed steel to reduce the effect of the magnetic field produced by drive magnet 110 and motive coil 118 on the operation of tape head 22. Drive magnet 110 may be made from nickel plated NdFeB. Motive coil 118 is preferably a free coil made by winding 860 turns of insulated 38 gage copper wire in 20 layers on a mandrel. The coils are then fused by baking in an oven. The resulting toroidal shape defines cylindrical opening 122 for receiving drive magnet 110. Cup 114 defines open end 124 for admitting coil bracket 120 holding motive coil 118.

Figure 4:
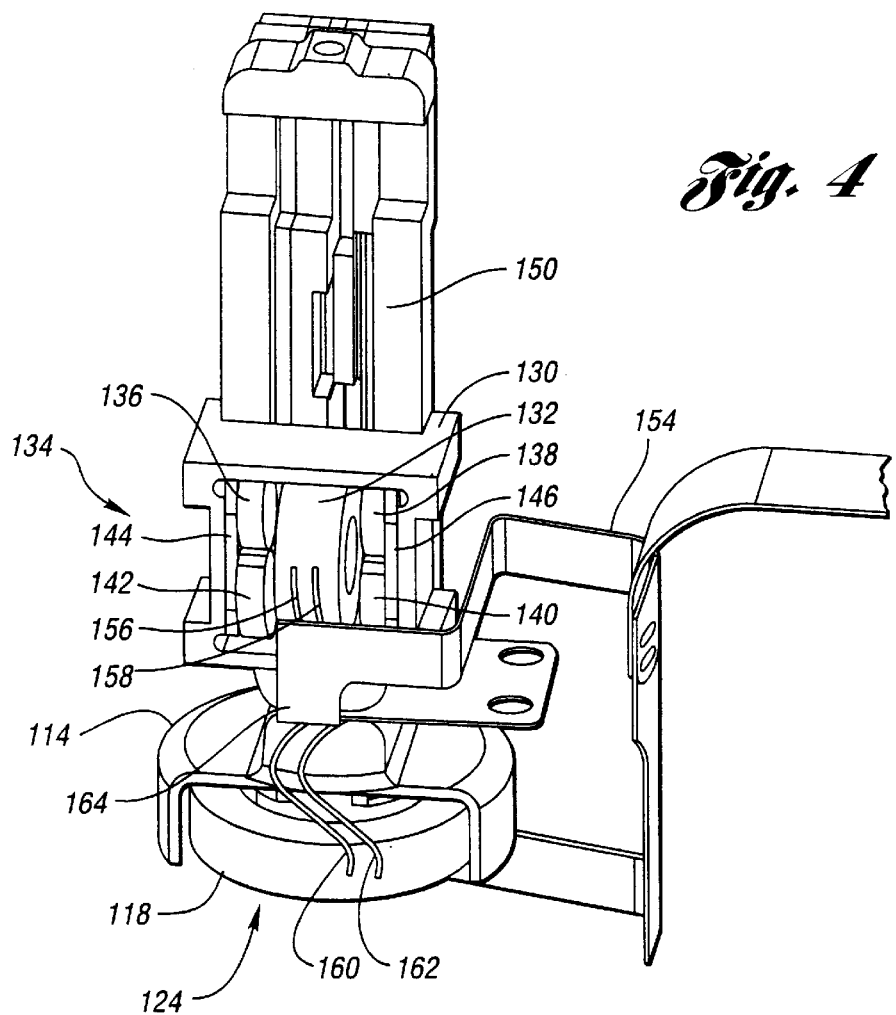
FIG. 4 is a rear perspective view of a portion of a fine positioning system including a velocity tachometer according to an embodiment of the present invention.

Referring now to FIG. 4, a rear perspective view of a portion of the fine positioning system including a velocity tachometer according to the present invention is shown. Open end 124 in cup 114 admits motive coil 118. Coils bracket 130 also holds conductive sensing coil 132 so that motive coil 118 and sensing coil 132 move in unison. Coils bracket 130 is preferably constructed from an engineering polymer such as polycarbonite. Sensing coil 132 may be a free coil constructed of 212 turns of 38 gage copper wire in 10 layers. Motive coil 118 and sensing coil 132 are attached to coils bracket 130 by an adhesive such as Locktite 495.

Sensing coil 132 is part of a linear velocity tachometer, shown generally by 134. Velocity tachometer 134 also includes tachometer magnets 136, 138, 140, 142 and flux strips 144, 146 attached to tape head 22. First pair of tachometer magnets 136, 138 are axially magnetized to produce flux flowing between tachometer magnets 136, 138 in a first direction normal to transverse direction 28. Second pair of tachometer magnets 140, 142 are axially magnetized to produce flux flowing between tachometer magnets 140, 142 in a second direction opposite the first direction. Flux strip 144 magnetically couples tachometer magnets 136, 142 and flux strip 146 magnetically couples tachometer magnets 138, 140 to create a magnetic circuit having two gaps through which passes sensing coil 132. As tape head 22 moves relative to sensing coil 132, the magnetic field produced by tachometer magnets 134, 136, 138, 140 induces a voltage in sensing coil 132 proportional to the velocity of tape head 22 in transverse direction 28. This voltage may be used to electromechanically dampen oscillations of tape head 22 as described with regards to FIG. 5 below.

Tachometer magnets 134, 136, 138, 140 and flux strips 144, 146 are glued into coils bracket 130. Tachometer magnets 136, 138, 140, 142 may be made from nickel plated NdFeB. Flux strips 144, 146 may be made of a magnetically permeable material such as gray iron. Head frame 150 may be constructed of an engineering polymer such as polycarbonite.

Coil flex cable 154 connects motive coil 118 and sensing coil 132 with a fine positioning control system not shown. Wires 156, 158 from sensing coil 132 and wires 160, 162 from motive coil 118 are soldered to pads on connecting portion 164 of coil flex cable. Coil flex cable 154 is then attached to coils bracket 130 by an adhesive such as Locktite 495.

Figure 5:
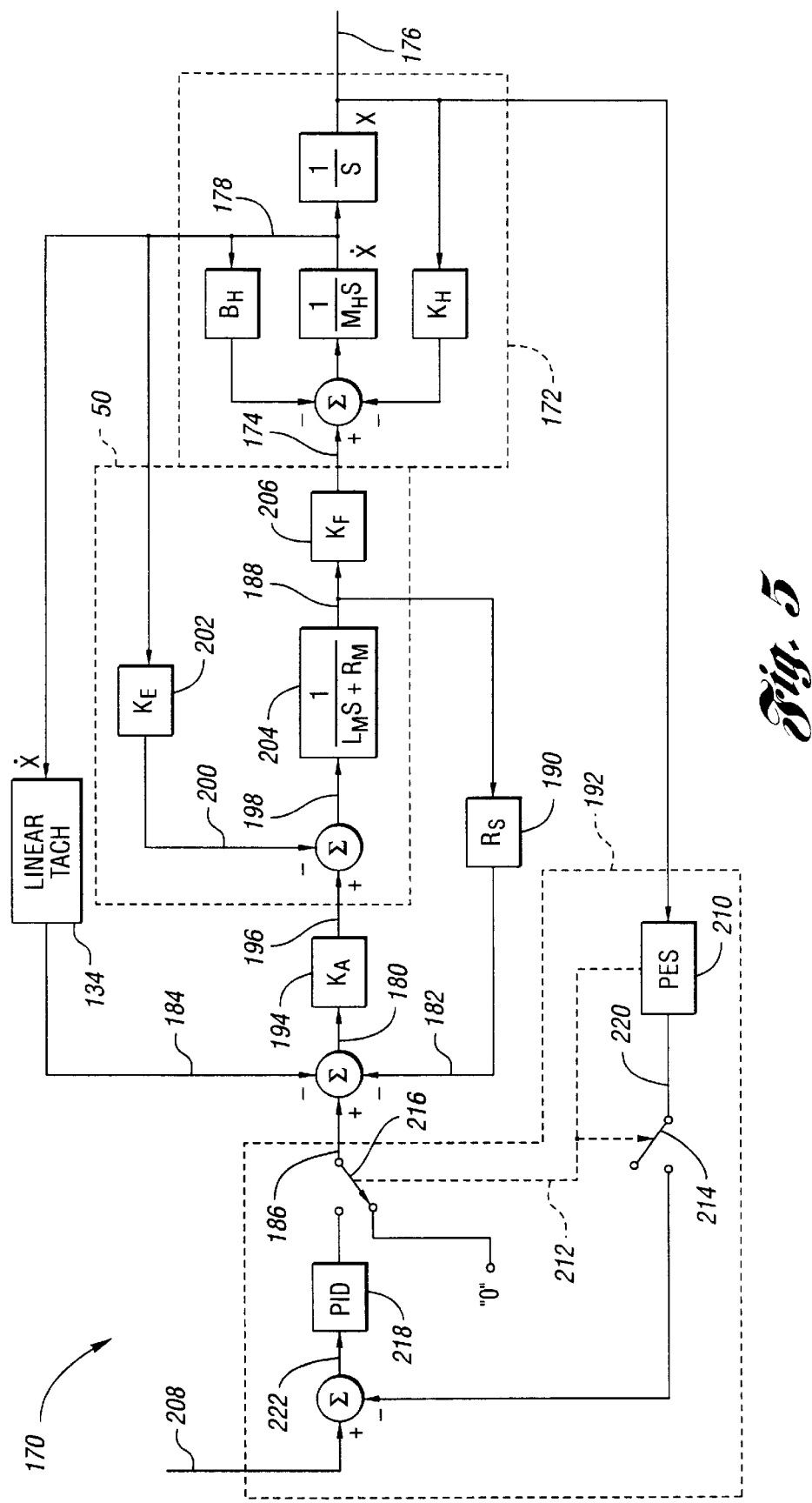
FIG. 5 is a block diagram illustrating an embodiment for controlling the magnetic tape head fine positioning system.

Referring now to FIG. 5, a block diagram illustrating an embodiment for controlling the magnetic tape head fine positioning system is shown. The block diagram is a Laplacian representation of fine positioning control system 170 as is commonly used in the art of control system. Control system 170 is operative to receive a command to move tape head 22 in transverse direction 28, generate a control signal to change the position of tape head 22 relative to carriage frame 40, and modify the control signal to dampen oscillations of tape head 22 based on a velocity signal from velocity tachometer 134.

Tape head dynamics 172 model the response of tape head 22 and flexures 52, 54 by implementing the second order differential equation of Equation 1:

$$F = M_H \ddot{x} + B_H \dot{x} + K_H x \tag{1}$$

where F is applied force 174 from voice coil motor 50, $M_H$ is the effective mass of tape head 22, $B_H$ is the natural damping coefficient of tape head 22 provided by the surrounding air and flexures 52, 54, $K_H$ is the spring constant for flexures 52, 54, x is head displacement 176 in transverse direction 28, $\dot{x}$ is head velocity 178 in transverse direction 28, and $\ddot{x}$ is the acceleration of tape head 22 in transverse direction 28.

Voltage error signal 180 is found by subtracting drive current sense voltage 182 and velocity sense voltage 184 from position error voltage 186. Velocity sense voltage 184 is developed by velocity tachometer 134 from head velocity 178. This provides damping feedback to resist disturbances in the motion of tape head 22. Drive current sense voltage 182 measures the amount of drive current 188 flowing through current sense resistor 190. Position error voltage 186 is developed by controller 192 as will be described below. Amplifier 194 amplifies voltage error signal 180 to produce motive coil voltage 196 controlling voice coil motor 50. Voice coil motor 50 generates drive voltage 198 as the difference between motive coil voltage 196 and back electromotive force (EMF) voltage 200. Back EMF voltage 200 is related to head velocity 178 by back EMF constant ($K_E$)

202. Drive voltage 198 is converted to drive current 188 by voice coil dynamics 204. Drive current 188 is converted to applied force 174 by force constant ($K_F$) 206. Hence, drive current 188 is a control signal changing the position of tape head 22 relative to carriage frame 40.

Controller 192 accepts head displacement 176 and position command 208 and produces position error voltage 186. Controller 192 includes position error system (PES) 210. PES 210 serves a dual role depending on whether tape system 20 is in coarse positioning mode or fine positioning mode. In coarse positioning mode, PES 210 determines if tape head 22 is roughly positioned over the correct set of data tracks on magnetic tape 24. While in coarse positioning mode, PES 210 sets control 212 to open switch 214 and sets switch 216 to generate zero as position error voltage 186, effectively disabling fine positioning. In fine positioning mode, PES 210 closes switch 214 and sets switch 216 to provide the output of proportional-integral-differential (PID) controller 218 as position error voltage 186, enabling fine positioning. PES 210 generates position signal 220 indicating head displacement 176. Controller 192 finds position error signal 222 as the difference between position command 208 and position signal 220. As is known in the art, the proportional, integral, and differential coefficients in PID controller 218 may be set to control the response of control system 170. In particular, the integral constant may be set to zero, the differential constant to the inverse of the resonant frequency of tape head 22 and flexures 52, 54, and the proportional constant to 3.4785.

Figure 6:
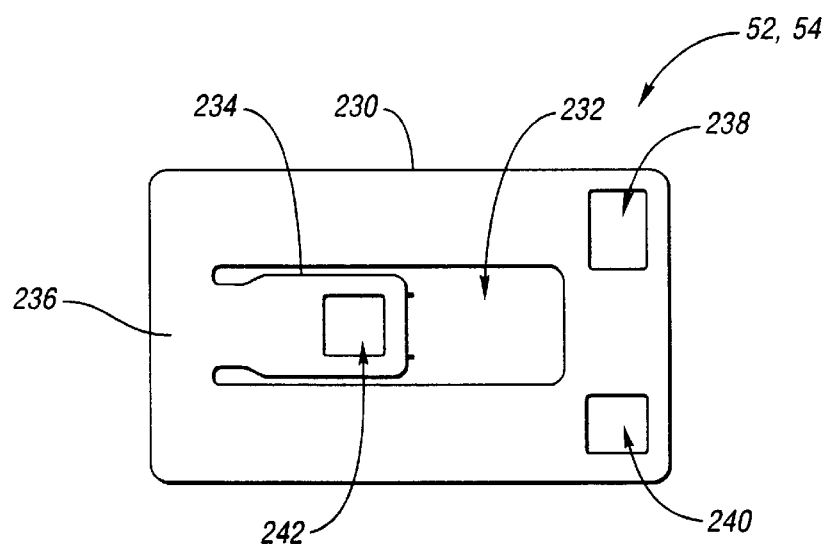
FIG. 6 is a plan view of a flexure according to an embodiment of the present invention.

Referring now to FIG. 6, a plan view of a flexure according to an embodiment of the present invention is shown. Flexure 52, 54 includes first spring member 230 shaped generally like a rectangular frame defining rectangular opening 232. Second spring member 234 is shaped substantially like a rectangular strip. One short end of second spring member 234 extends from short side 236 of first spring member 230 into rectangular opening 232. First spring member 230 defines first hole 238 and second hole 240 on the side opposite short side 236. Holes 238, 240 accept flexure screws 92, 94, 98 for attaching flexure 52, 54 to carriage frame 40. Second spring member 234 defines third hole 242 for attaching flexure 52,54 to tape head 22. Flexure 52, 54 may be constructed of a thin sheet of metal such as beryllium copper 190 brush alloy or similar spring steel.

In operation, flexure 52, 54 deflects in transverse direction 28, which is normal to the plane of FIG. 6. The two long sides of first spring member 230 and second spring member 234 elastically deform to allow tape head 22 to move in transverse direction 28 relative to carriage frame 40. The long sides of first spring member 230 restrict translation in tape direction 26 as well as in a direction normal to the surface of tape 24 passing over head 22. The construction of flexures 52,54 also restricts rotation of tape head 22 relative to carriage frame 40.

Figure 7:
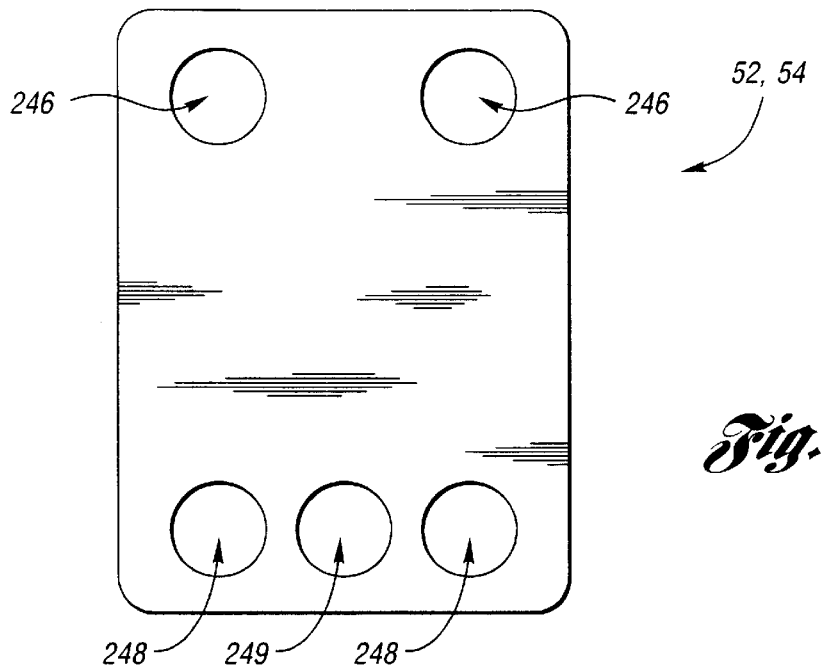
FIG. 7 is a plan view of an alternative flexure according to an embodiment of the present invention.

Referring now to FIG. 7, a plan view of an alternative flexure according to an embodiment of the present invention is shown. Flexure 52, 54 are thin rectangular strips having holes 246 accepting flexure screws 92, 94, 98 for attaching flexure 52, 54 to carriage frame 40 and holes 248 for attaching flexure 52, 54 to tape head 22. Hole 249 accepts nib 116 on cup 114 for flexure 52. Screws and nib 116 prevent rocking of voice coil motor 50, permitting high bandwidth frequency response of fine positioning system 30. Flexure 52, 54 may be constructed of a thin sheet of metal such as beryllium copper 190 brush alloy or similar spring steel.

Figure 8:
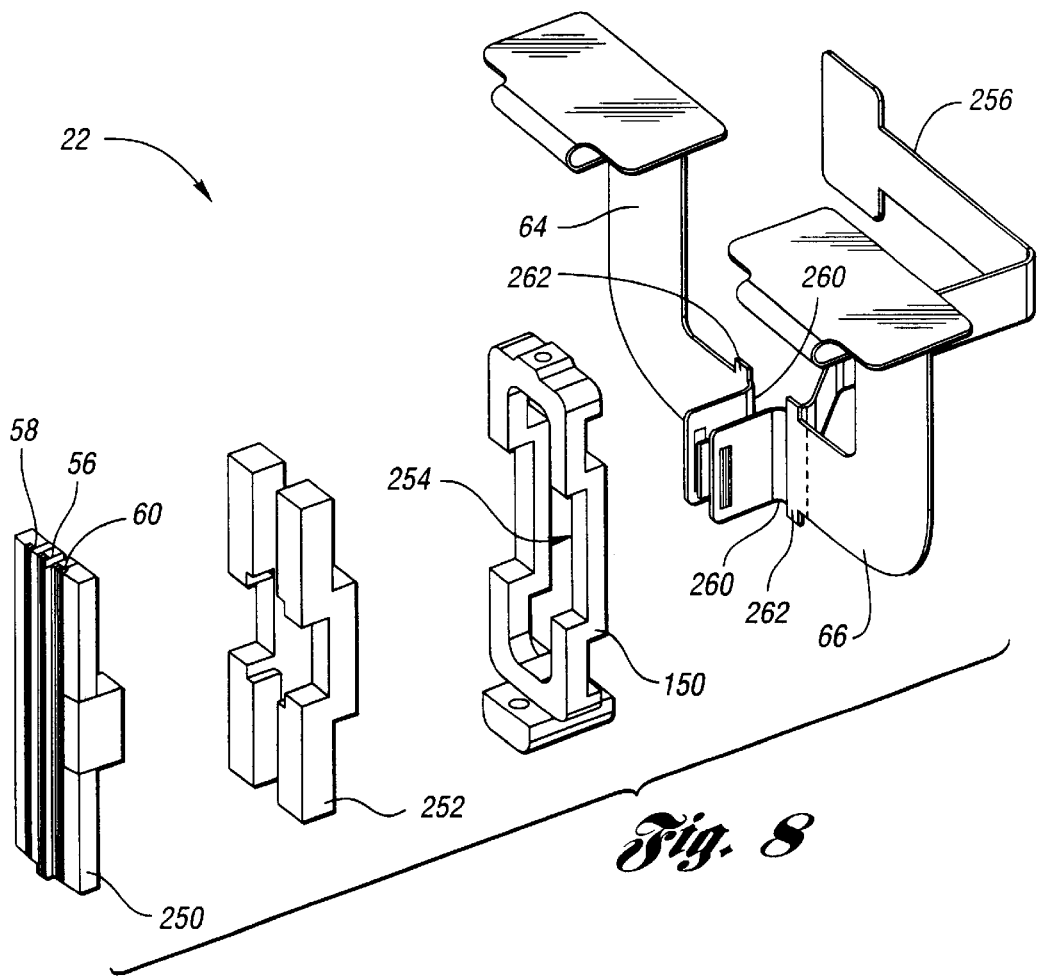
FIG. 8 is an exploded view of the magnetic tape head with connecting cables according to an embodiment of the present invention.

Referring now to FIG. 8, an exploded view of the tape head and cabling is shown. Tape head 22 includes head module assembly 250, backing spacer 252, and head frame 150. Head frame 150 defines cable opening 254 through which pass read cables 64, 66 and write cable 256. Write cable 256 and read cables 64, 66 pass through cable opening 254 and connect to write module 56 and read modules 58, 60 respectively in head module assembly 250.

Each read cable 64, 66 forms angle 260 substantially at the point where read cable 64, 66 attaches to one of the read modules. Angle 260 directs the remainder of read cable 64, 66 away from write cable 256. This reduces electromagnetic interference produced by write cable 256 from reaching read cable 64, 66. In a preferred embodiment, angle 260 is substantially a right angle. Angle 260 may be rigidly molded as part of read cable 64, 66 or an adhesive such as Locktite 495 may be applied to adhesive region 262 of read cable 64, 66 to affix read cable 64, 66 to head frame 150.

Figure 9:
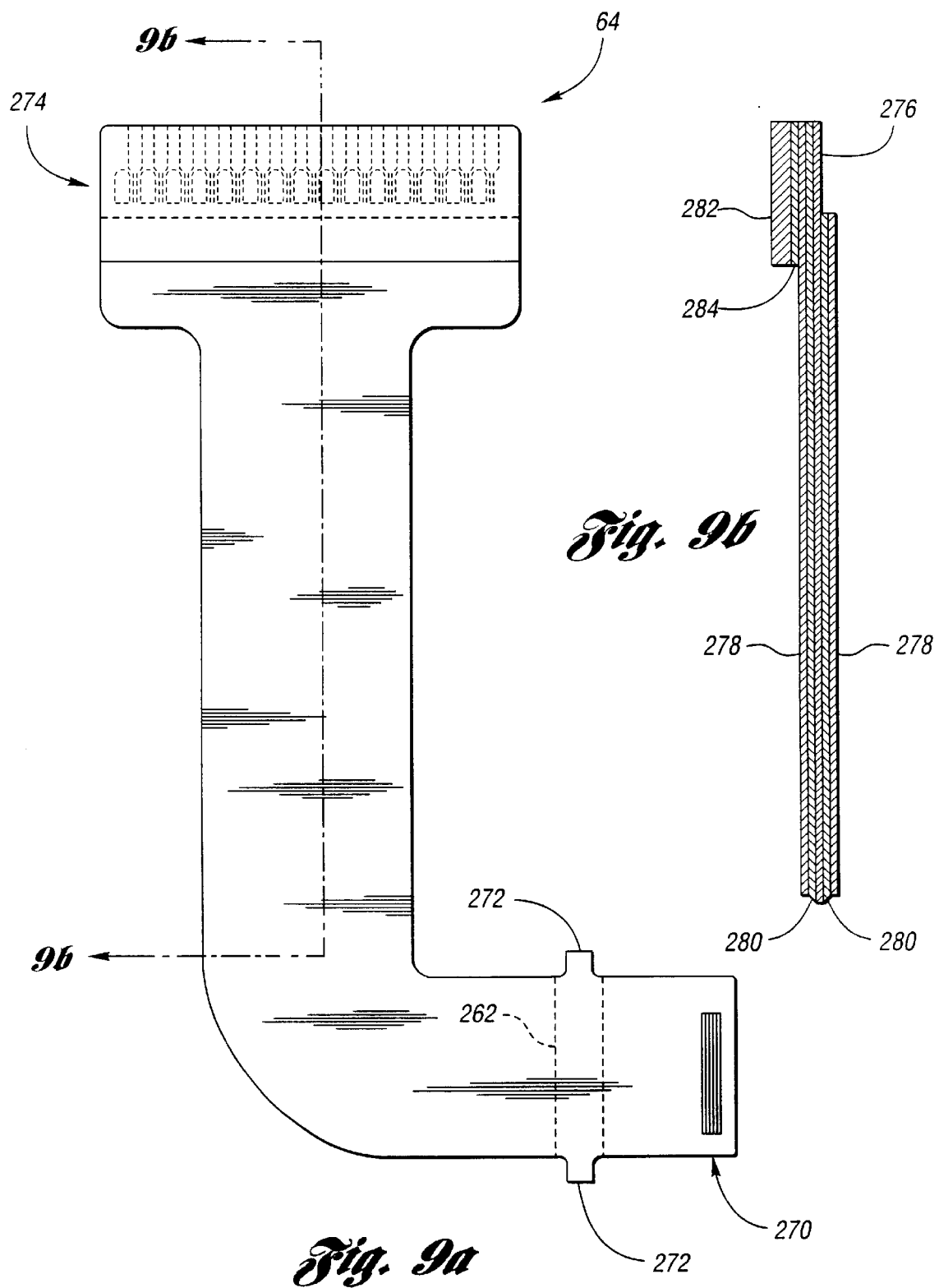
FIG. 9a is a plan view and FIG. 9b is a partial sectional view of a read cable according to an embodiment of the present invention.

Referring now to FIG. 9a, a plan view of a read cable according to an embodiment of the present invention is shown. First read cable 64 includes a plurality of pads, shown generally by 270, for connecting to traces on first read module 58. Extensions 272 increase adhesive region 262 used to affix read cable 64 to head frame 150. At the opposite end of read cable 64, a plurality of pads, shown generally by 274 connect read cable 64 to read electronics. The size and spacing of pads 274 are designed to meet the requirements of a mating connector such as, for example, a part number 88384-30X by Berg Electronics of St. Louis, Mo., on a read card. Second read cable 66 is a mirror image of first read cable 64.

Referring now to FIG. 9b, a partial sectional view of the read cable of FIG. 9a is shown. First read cable 64 includes two traces for each read element in first read module 58. Each trace 276 may be made from rolled/annealed copper. Traces 276 are protected on each side by insulation layer 278 which may be roll stock polyamide film attached to traces 276 by adhesive layer 280 such as epoxy. In the region of pads 274, one insulation layer 278 is removed to expose traces 276. Stiffener layer 282 may be added in the region of pads 274 using adhesive layer 284 to provide additional rigidity. Stiffener layer 282 may also be a polyamide film and adhesive layer 284 may also be epoxy.

Figure 10:
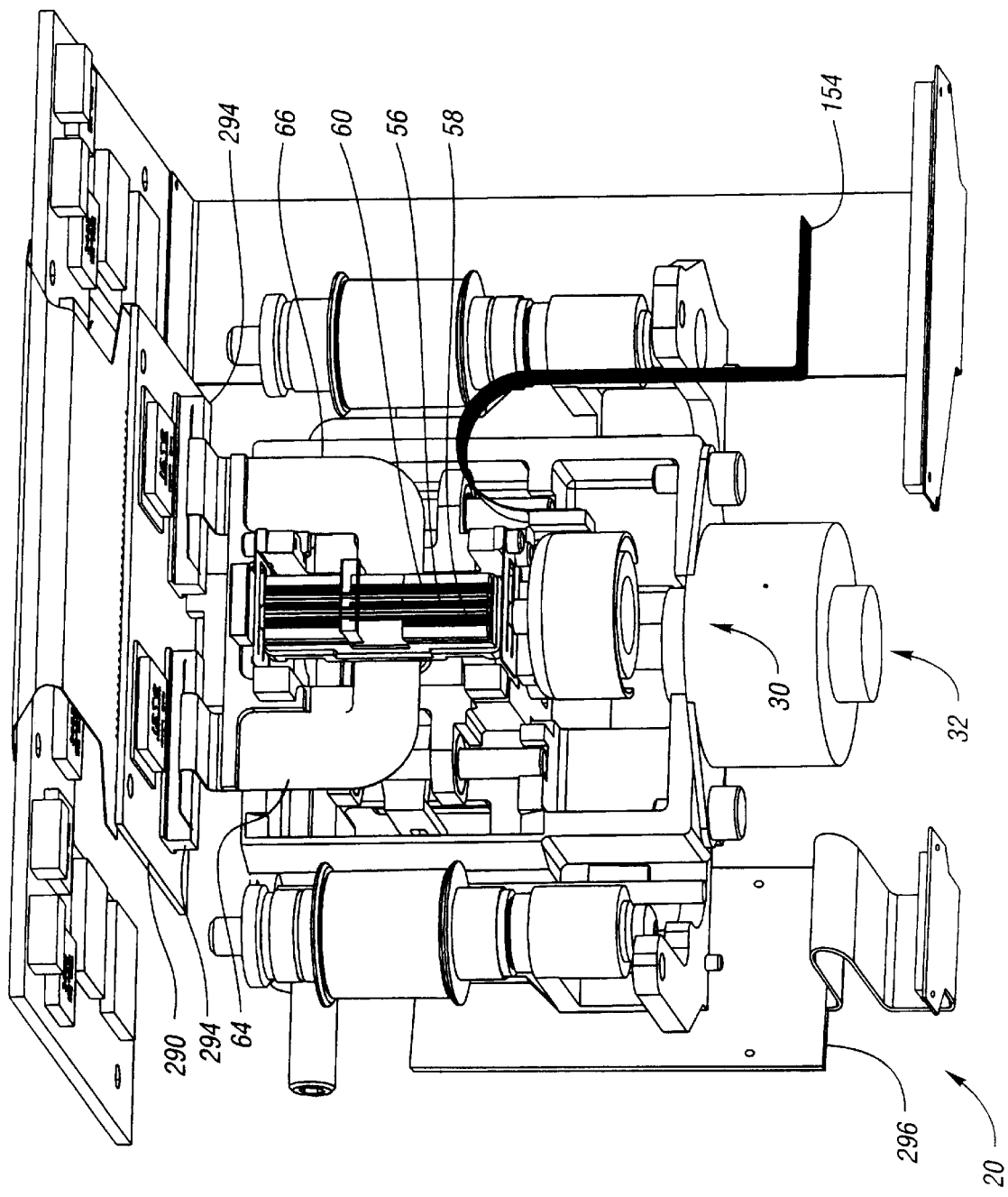
FIG. 10 is a perspective view of an embodiment of a tape system including read cabling.

Referring now to FIG. 10, a perspective view of an embodiment of a tape system including read cabling is shown. Tape system 20 includes read card 290 connected to read modules 58, 60 by read cables 64, 66. Read card 290 receives read signals from read modules 58, 60 and converts the read signals into digital signals. First read cable 64 is attached to read card 290 by connector 292 and second read cable 66 is attached to read card 290 by connector 294. Tape system 20 also includes write card 296 for receiving digital signals and converting the digital signals into write signals which are sent to write module 56 by write cable 256 not shown in FIG. 10. Read card 290 and write card 296 may be one card. Similarly, read and write electronics may be split between multiple read cards 290 and write cards 296. Read card 290 and write card 296 are attached to carriage frame 40 and, therefore, are moved by coarse positioning drive mechanism 32. Flexibility in read cables 64, 66 and write cable 256 permit relative motion between tape head 22 and cards 290, 296 when tape head 22 is moved by fine positioning drive mechanism 30.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A system for accessing magnetic tape comprising:
   a carriage frame;
   a magnetic tape head operative to read from and write to the magnetic tape as the tape passes in close proximity to the tape head;
   a drive mechanism operative to move the tape head in a transverse direction with respect to the carriage frame in response to a control signal, the transverse direction normal to a direction of tape travel across the tape head and parallel to the tape surface;
   a linear velocity tachometer operative to determine a velocity signal based on the movement in the transverse direction of the tape head relative to the carriage frame; and
   a control logic in communication with the drive mechanism and the tachometer, the control logic operative to
   (a) receive a command to move the tape head in the transverse direction,
   (b) generate a control signal to change the head position, and
   (c) modify the control signal to dampen tape head oscillations relative to the carriage frame based on the velocity signal.

2. A system for accessing magnetic tape as in claim 1 further comprising:
   a first flexure between the carriage frame and a first end of the tape head; and
   a second flexure between the carriage frame and a second end of the tape head opposite the tape head first end;
   wherein the first flexure and the second flexure permit the tape head to move in the transverse direction, the first flexure and the second flexure further restricting movement of the tape head in a direction parallel to tape travel and in a direction normal to the tape surface.

3. A system for accessing magnetic tape as in claim 2 wherein the flexure member and the second flexure are constructed from a thin sheet of metal.

4. A system for accessing magnetic tape as in claim 1 wherein each of the first flexure and the second flexure comprises:
   a first spring member shaped like a rectangular frame, the rectangular frame defining a rectangular opening within the first spring member; and
   a second spring member shaped substantially like a rectangular strip, a short end of the rectangular strip extending from a short side of the rectangular frame into the rectangular opening;
   wherein the rectangular frame short side opposite the short side from which the second spring member extends is rigidly attached to the carriage frame and the rectangular strip short end opposite the short end extending from the rectangular frame is rigidly attached to the tape head.

5. A system for accessing magnetic tape as in claim 4 wherein the first spring member defines at least one hole on one short side of the rectangular frame opposite the short side from which the second spring member extends and wherein the second spring member defines at least one hole on the short end opposite the short end extending from the rectangular frame, each of the at least one hole operative to receive a fastener for rigidly attaching the spring member defining the at least one hole.

6. A system for accessing magnetic tape as in claim 1 wherein the velocity tachometer comprises a conductive sensing coil stationary relative to a magnetic field moving with respect to the sensing coil, the velocity signal based on the voltage produced by the relative motion of the sensing coil and the magnetic field.

7. A system for accessing magnetic tape as in claim 6 wherein the tape head is held in a head frame, the velocity tachometer comprising at least one pair of magnets attached to the head frame and spaced so as to produce a magnetic field between the magnets in each of the at least one pair of magnets, each magnetic field having flux lines extending normal to the transverse direction, the conductive sensing coil rigidly attached to the carriage frame and positioned to move between each of the at least one pair of magnets.

8. A system for accessing magnetic tape as in claim 1 wherein the drive mechanism is a voice coil motor comprising:
   a drive magnet attached to the tape head; and
   a conductive motive coil attached to the carriage frame, the motive coil forming an opening for admitting the magnet.

9. A system for accessing magnetic tape as in claim 8 wherein the voice coil motor further comprises a cup having an open end, the cup positioned around the drive magnet so as to admit the motive coil through the open end, the cup constructed of a magnetically permeable material thereby reducing the effect of a magnetic field produced by the drive mechanism on the tape head.

10. A system for accessing magnetic tape comprising:
    a carriage frame;
    a magnetic tape head operative to read from and write to the magnetic tape as the tape passes in close proximity to the tape head;
    a drive mechanism operative to move the tape head in a transverse direction with respect to the carriage frame in response to a control signal, the transverse direction normal to a direction of tape travel across the tape head and parallel to the tape surface;
    a first flexure between the carriage frame and a first end of the tape head; and
    a second flexure between the carriage frame and a second end of the tape head opposite the tape head first end;
    wherein at least one of the first flexure and the second flexure comprises a first spring member shaped like a frame, the frame defining an opening within the first spring member, and a second spring member shaped substantially like a strip, an end of the strip extending from the frame into the opening, a frame side opposite the side from which the second spring member extends attached to the carriage frame and a strip end opposite the strip end extending from the frame attached to the tape head.

11. A system for accessing magnetic tape as in claim 10 wherein the first spring member is shaped like a rectangular frame, the opening is a rectangular opening within the first spring member, and the second spring member is shaped substantially like a rectangular strip.

12. A system for accessing magnetic tape as in claim 11 wherein the first spring member defines at least one hole on one short side of the rectangular frame opposite the short side from which the second spring member extends and wherein the second spring member defines at least one hole on the short end opposite the short end extending from the rectangular frame, each of the at least one hole operative to receive a fastener for rigidly attaching the spring member defining the at least one hole.

13. A system for accessing magnetic tape as in claim 10 wherein the first spring member and the second spring member are constructed from a thin sheet of metal.

* * * * *